United States Patent Office 2,882,262
Patented Apr. 14, 1959

2,882,262

N-(ACRYLOXYALKYL)- AND N-(METHACRYL-OXYALKYL)-2-PYRROLIDONES AND POLYMERS THEREOF

Donald A. Smith and Cornelius C. Unruh, Rochester, N.Y., assignors to Eastman Kodak Company, Rochester, N.Y., a corporation of New Jersey No Drawing. Application May 14, 1956
Serial No. 584,429

8 Claims. (Cl. 260—80.5)

This invention relates to N-(acryloxyalkyl)- and N-(methacryloxyalkyl)-2-pyrrolidones, to polymers thereof, and to a process for their preparation.

It is known that monomeric N-vinylpyrrolidone homopolymerizes to useful resinous materials quite easily, but does not enter readily into copolymerization with certain other monomers. Attempts to form such copolymers usually result in products which are quite heterogeneous and of relatively low molecular weight. We have now found that the useful properties of the N-pyrrolidone function

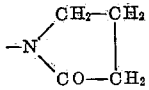

can be incorporated into polymers by preparing readily polymerizable and copolymerizable monomers containing this function. Of particular value, we have found, are the acrylic and methacrylic esters of N-(hydroxyalkyl)-2-pyrrolidones such as N-($\beta$-acryloxyethyl)-2-pyrrolidone. These monomers are capable of undergoing homopolymerization and copolymerization with a wide variety of ethylenically unsaturated polymerizable monomers. Many of these polymers are water-soluble and compatible with gelatin, and quite hydrophilic depending on the content of the N-pyrrolidone function in the polymer. These polymers have particular utility as photographic silver halide emulsion vehicles, as subbing and backing layers for photographic films and as hydrophilic surfaces for lithography and other photomechanical reproduction processes.

It is, accordingly, an object of the invention to provide a new class of acrylic compounds containing the N-pyrrolidone function. Another object is to provide polymers of the same which are particularly useful in the photographic art. Another object is to provide a process for preparing the new class of compounds. Other objects will become apparent hereinafter.

In accordance with the invention, we prepare the new class of compounds represented by the general formula:

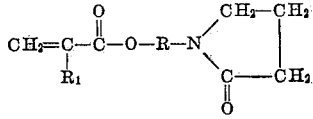

wherein R represents a divalent alkylene group of from 2 to 4 carbon atoms such as —$CH_2CH_2$—,

—$CH_2CH_2CH_2$—

—$CH_2CH_2CH_2CH_2$—, —$CH(CH_3)CH_2$—, etc. and $R_1$ represents a hydrogen atom or a methyl group, by reacting at room temperature or above an N-hydroxyalkyl-2-pyrrolidone such as N-hydroxyethyl-2-pyrrolidone with acrylic or methacrylic anhydride, in approximately equimolar proportions, in an inert medium such as pyridine, a picoline, a lutidine, etc., and separating the above defined product from the reaction mixture by distillation.

The intermediate N-hydroxyalkyl-2-pyrrolidones can be prepared as described by B. Puetzer et al., J.A.C.S., vol. 74, pages 4959–60 (1952), by reacting $\gamma$-butyrolactone with an alkanolamine such as ethanolamine, propanolamine, butanolamine, etc.

The polymerization of the new monomers of the invention alone or conjointly with one or more other polymerizable compounds to high molecular weight resinous polymers is accelerated by heat, by actinic light and by polymerization catalysts which are known to promote the polymerization reactions such as peroxide type including benzoyl peroxide, acetal peroxide, lauroyl peroxide, tertiary butyl hydroperoxide, hydrogen peroxide, persulfates such as ammonium persulfate, sodium persulfate, potassium persulfate, persulfuric acid, etc., perborates such as sodium perborate and other alkali metal perbolates, the water-soluble salts of percarbonic acid, the water-soluble salts of perphosphoric acid, azo-bis-isobutyronitrile, etc. Mixtures of one or more of the catalysts can be employed. The amount of catalyst employed can vary from about 0.2 to 3.0 percent, based on the weight of monomer to be polymerized. An activating agent such as sodium bisulfite can be used, if desired, in conjunction with the polymerization catalysts in aqueous systems. For mass polymerizations, an organic peroxide is preferred. The temperature of polymerization can vary over a wide range, but preferably the polymerizations are carried out at from about 30–100° C. Chain regulators such as alkyl mercaptans (e.g. hexyl, octyl, lauryl, dodecyl mercaptans, etc.) can also be added with advantage to the polymerization mixtures.

The polymerizations can be carried out in mass or in dispersed form in a nonsolvent for the monomers, the particles of dispersed monomer being very small (emulsion) or relatively large (bead or granular). For dispersion polymerizations, any nonsolvent for the monomers can be employed, water being an especially suitable nonsolvent. Advantageously an emulsifying or dispersing agent is added to the polymerization mixtures in an amount not exceeding about 3 percent of the weight of monomers. Suitable emulsifying agents include salts of higher fatty acids (e.g. sodium or potassium stearate, palmitate, etc.), ordinary soaps, salts of higher fatty alcohol sulfates (e.g. sodium or potassium cetyl sulfate, sodium or potassium lauryl sulfate, sodium or potassium stearyl sulfate, etc.), salts or aromatic sulfonic acids (e.g. sodium or potassium salts of alkylnaphthalene sulfonic acids, etc.), higher molecular weight quaternary ammonium salts (e.g. dimethyl benzylphenyl ammonium chloride, quaternary ammonium salts containing the radicals $C_{15}H_{31}$ and $C_{17}H_{35}$, etc.) or dispersing agents such as starch, methylated starch, gum arabic, finely divided magnesium carbonate, polyvinyl alcohol, and the like. Mixtures of emulsifying and dispersing agent can be used. Stirring, shaking or tumbling of the polymerization mixture during the polymerization reaction gives improved product and yield.

The new monomers of the invention readily copolymerize with one or more other polymerizable unsaturated compounds containing a single ethylenic unsaturation, i.e., containing the basic group $CH_2$=$C<$, to give high molecular weight resinous polymers, for example, one or more of any of the new monomers with one or more unsaturated compounds from the group including vinyl esters of carboxylic acids (e.g. vinyl acetate, vinyl propionate, vinyl butyrate, vinyl stearate, vinyl trifluoroacetate, vinyl benzoate, etc.), and corresponding isoalkenyl esters such as isopropenyl acetate, vinyl chloride, vinylidene chloride, styrene, $\alpha$-alkylstyrenes such as $\alpha$-methylstyrene, vinyl toluenes such as p-vinyl toluene, etc., acrylonitrile, methacrylonitrile, vinyl alkyl ethers such as vinyl methyl ether, vinyl ethyl ether, etc., acrylic and methacrylic acids and alkyl esters and amides thereof such as methyl acrylate, butyl acrylate, methyl methacrylate, acrylamide, N-methylacrylamide N,N-dimethylacrylamide, N-isopropylacrylamide, methacrylamide, N-methyl methacrylamide, etc., maleic anhydride, maleic and fumaric acids and esters and amides thereof such as dimethyl maleate, dimethyl fumarate, maleic acid amide, N-alkyl substituted maleic acid amides and corresponding fumaric acid amides, vinyl pyridines and homologues thereof, N-vinylpyrrolidone, ethylene, isobutylene, 1,3-butadiene, and the like. The proportions of the components in the copolymers can vary from about 4.5 to 75% by weight of the new N-(acryloxyalkyl)- or N-(methacryloxyalkyl)-2-pyrrolidones to from 95.5 to 25% by weight of one or more of the above mentioned suitable comonomers. Where a ternary copolymer is prepared such as one containing the new acrylic ester of the invention, acrylamide and acrylonitrile, the latter two components can vary in the ratio of from 75–90% by weight of acrylamide to from 25–10% by weight of acrylonitrile. In general, the copolymeric products contain about the same proportions of combined components as were present in the starting polymerization mixtures.

The following examples will serve to illustrate further our new monomers, polymers thereof, and the manner of preparing the same.

*Example 1.—N-(βacryloxyethyl)-2-pyrrolidone*

To a cooled solution of 50 g. of N-(β-hydroxyethyl)-2-pyrrolidone in 50 cc. of pyridine, there were added 55 g. of acrylic anhydride. After standing for 3 days at room temperature, the mixture was distilled and the fraction boiling at 125°–140° C. and 3 mm. pressure was collected. Redistillation of the collected material yielded 46 g. of colorless oil, B.P. 128°–134° C./2.5 mm.

In place of the N-(β-hydroxyethyl)-2-pyrrolidone, there may be substituted an equivalent amount of another similar compound such as N-(β-hydroxyisopropyl)-2-pyrrolidone, N-(γ-hydroxypropyl)-2-pyrrolidone, N-(γ-hydroxybutyl)-2-pyrrolidone, and the like to give the corresponding N-(β-acryloxyisopropyl)-2-pyrrolidone, or N-(γ-acryloxypropyl)-2-pyrrolidone or N-(γ-acryloxybutyl)-2-pyrrolidone. Also, the acrylic anhydride in the above example can be replaced by an equivalent amount of methacrylic anhydride to give the methacrylic acid derivatives of the above mentioned N-(hydroxyalkyl)-2-pyrrolidones.

*Example 2.—Homopolymer of N-(β-acryloxyethyl)-2-pyrrolidone*

A solution of 10.0 g. of N-(β-acryloxyethyl)-2-pyrrolidone in a mixture of 9.0 cc. of ethanol and 16.0 cc. of water was treated with 0.1 g. of benzoyl peroxide, and then sealed in a glass tube under nitrogen. After 62 hours at 65° C., the smooth viscous dope was precipitated in acetone ether and finally washed with ether. Compositions containing smaller amounts of ethanol produced water-insoluble polymers.

By following the above procedure, there can readily be prepared the homopolymers of any other of the N-(acryloxyalkyl)- or N-(methacryloxyalkyl)-2-pyrrolidones mentioned in Example 1.

*Example 3.—Copolymers of N-(β-acryloxyethyl)-2-pyrrolidone and acrylamide*

(A) A solution containing 0.5 g. of N-(β-acryloxyethyl)-2-pyrrolidone 6.0 g. of acrylamide, 0.05 g. of ammonium persulfate, 55 cc. of water and 5.5 cc. of ethanol was heated on a steam bath for 30 minutes. The smooth viscous dope was poured into methanol and the precipitate washed with methanol and dried.

(B) In a similar manner to above A, 1.5 g. of N-(β-acryloxyethyl)-2-pyrrolidone and 10.0 g. of acrylamide were copolymerized.

(C) In a similar manner to above A, 2.0 g. of N-(β-acryloxyethyl)-2-pyrrolidone and 10.0 g. of acrylamide were copolymerized.

(D) A solution consisting of 3.6 g. of N-(β-acryloxyethyl)-2-pyrrolidone, 1.4 g. of acrylamide, 20 cc. of water and 0.5 cc. of 30% hydrogen peroxide was heated at 60° C. After two days, a clear, colorless viscous mass, which was a copolymer of 72% by weight of the said pyrrolidone compound and 28% by weight of acrylamide, had formed.

All of the above products of A, B, C and D were useful as vehicles, with or without gelatin, for silver halides.

*Example 4.—Copolymer of N-(β-acryloxyethyl)-2-pyrrolidone and methyl methacrylate*

A mixture consisting of 3.6 g. of N-(β-acryloxyethyl)-2-pyrrolidone, 2.0 g. of methyl methacrylate, 0.03 g. of azobisisobutyronitrile and 5 cc. of dioxane was placed in a glass vial and sealed. The tube and contents were heated at 60° C. In a few hours, a clear, colorless, viscous mass was formed which subsequently became a nonflowing mass at room temperature.

*Example 5.—Copolymers of N-(β-acryloxyethyl)-2-pyrrolidone and styrene*

(A) A mixture consisting of 3.6 g. of N-(β-acryloxyethyl)-2-pyrrolidone, 2.1 g. of styrene, 0.03 g. of azobisisobutyronitrile and 5 cc. of dioxane was placed in a glass tube and placed in a 60° C. water bath. After 16 hours, a clear, colorless, viscous mass was formed. The product was thinned with acetone and poured into a large volume of agitated methanol. A soft precipitate formed which was washed in several changes of methanol and dried. The polymer contained 4.1% by weight of nitrogen.

(B) A solution of 0.5 g. of N-(β-acryloxyethyl)-2-pyrrolidone, 10 g. of styrene and 0.05 g. of azo-bisisobutyronitrile was placed in a glass vial and heated at 60° C. for 16 hours. A hard, clear and slightly yellow mass of copolymer was formed.

*Example 6.—Copolymer of N-(β-acryloxyethyl)-2-pyrrolidone and β-diethylaminoethylmethacrylate*

A mixture consisting of 3.0 g. of N-(β-acryloxyethyl)-2-pyrrolidone, 2.6 g. of β-diethylaminoethylmethacrylate, 0.03 g. of azo-bisisobutyronitrile and 5 cc. of dioxane was sealed in a glass tube and heated at 60° C. After 16 hours, a pale yellow, very viscous mass was obtained. This was diluted with acetone and poured into a large volume of ether. The precipitate was washed in fresh ether and dried.

*Example 7.—Copolymers of N-(β-acryloxyethyl)-2-pyrrolidone, acrylamide and acrylonitrile*

(A) To a solution of 2.0 g. of N-(β-acryloxyethyl)-2-pyrrolidone, 10.0 g. of acrylamide and 3.0 g. of acrylonitrile in 100 cc. of water, there were added 0.10 g. of potassium persulfate, and the mixture heated on a steam bath for 45 minutes. The viscous dope obtained was diluted with 100 cc. of water and poured into methanol. The soft precipitate obtained was washed with methanol and dried. A yield of copolymer of 13.0 g. was obtained. The copolymer was useful as a vehicle, with or without gelatin, for preparing silver-halide emulsions.

(B) In a similar manner to above A, 3.0 g. of N-(β-acryloxyethyl)-2-pyrrolidone, 9.0 g. of acrylamide and 3.0 g. of acrylonitrile were copolymerized to give a ternary copolymer having about the same properties as that obtained in A.

By proceeding in the manner set forth in the examples, other monomers and polymers thereof can be prepared. These polymers, as previously mentioned, are particularly useful as photographic emulsion vehicles, as subbing and backing layers for photographic films and as hydrophilic surfaces for lithographic and other photomechanical reproduction processes. The polymers are soluble in one or more volatile solvents such as water, acetone, dioxane, etc. and mixtures of these solvents.

The following examples illustrate photographic uses for the copolymers of the invention.

Example 8

A copolymer containing 10.0 g. acrylamide and 2.0 g. of acryloxyethylpyrrolidone was prepared and dissolved in distilled water to give a five-percent solution. This solution was combined with a photographic emulsion formula similar to those published by Trivelli and Smith (Photo. J., 79, 1939; 80, 1940) utilizing phthaloylated gelatin (Yutzy and Frame, U.S. Patent 2,614,928) as the silver halide peptizer. Dried coatings of the above showed compatibility of the vehicle and peptized silver halide grams. Exposure of the dried coatings to light gave a developable image.

Example 9

A solution containing 5.0 g. of a copolymer of poly-N-($\beta$-acryloxyethyl)-pyrrolidone with diethylaminoethylmethacrylate (4:1), 1.0 g. of 4,4'-diazidostilbene-2,2'-disulfonic acid, and 100 ml. of water was adjusted to a pH of 4–5 and coated on a suitable paper base. The dried coating was exposed to a source of ultraviolet light through a photographic negative. The exposed coating was treated with water to remove unexposed areas and the remaining hardened stencil was treated with an aqueous solution of a blue-green dye (Erio Fast Cyanine) to give a colored positive image corresponding to that of the negative.

What we claim is:

1. An acrylic ester having the general formula:

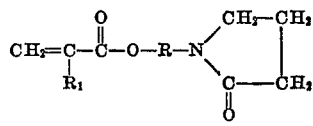

wherein R represents a divalent alkylene group containing from 2 to 4 carbon atoms and $R_1$ represents a member selected from the group consisting of a hydrogen atom and a methyl group.

2. N-($\beta$-acryloxyethyl)-2-pyrrolidone.

3. A polymer of an acrylic ester having the general formula:

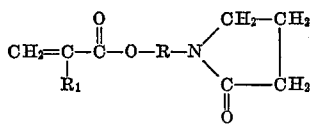

wherein R represents a divalent alkylene group containing from 2 to 4 carbon atoms and $R_1$ represents a member selected from the group consisting of a hydrogen atom and a methyl group.

4. A copolymer of from 4.5 to 75 parts by weight of N-($\beta$-acryloxyethyl)-2-pyrrolidone and from 95.5 to 25 parts by weight of acrylamide.

5. A copolymer of from 4.5 to 75 parts by weight of N-($\beta$-acryloxyethyl)-2-pyrrolidone and from 95.5 to 25 parts by weight of styrene.

6. A copolymer of from 4.5 to 75 parts by weight of N-($\beta$-acryloxyethyl)-2-pyrrolidone and from 95.5 to 25 parts by weight of methyl methacrylate.

7. A copolymer of from 4.5 to 75 parts by weight of N-($\beta$-acryloxyethyl)-2-pyrrolidone and from 95.5 to 25 parts by weight of a mixture of monomers consisting of from 75–90% by weight acrylamide and 25–10% by weight of acrylonitrile.

8. A copolymer of from 4.5 to 75 parts by weight of N-($\beta$-acryloxyethyl)-2-pyrrolidone and from 95.5 to 25 parts by weight of $\beta$-diethylaminoethylmethacrylate.

References Cited in the file of this patent

UNITED STATES PATENTS

| | | |
|---|---|---|
| 2,656,360 | Hagemeyer | Oct. 20, 1953 |

FOREIGN PATENTS

| | | |
|---|---|---|
| 61,825 | Holland | Sept. 16, 1948 |